United States Patent
Kawasaki (10) Patent No.: US 8,354,961 B2
(45) Date of Patent: Jan. 15, 2013

(54) DIRECTION FINDING SYSTEM AND DIRECTION FINDING APPARATUS

(75) Inventor: Yoshinobu Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 12/335,635

(22) Filed: Dec. 16, 2008

(65) Prior Publication Data

US 2009/0179799 A1    Jul. 16, 2009

(30) Foreign Application Priority Data

Jan. 11, 2008    (JP) .................................. 2008-004268

(51) Int. Cl.
*G01S 5/04* (2006.01)
(52) U.S. Cl. ...................................................... 342/442
(58) Field of Classification Search .................. 342/442, 342/432, 441, 424, 443
See application file for complete search history.

(56) References Cited

U.S. PATENT DOCUMENTS

| | | | | |
|---|---|---|---|---|
| 4,000,466 A * | 12/1976 | Scouten et al. | | 342/442 |
| 4,136,342 A * | 1/1979 | Alcock et al. | | 342/424 |
| 4,443,801 A * | 4/1984 | Klose et al. | | 342/442 |
| 4,639,733 A * | 1/1987 | King et al. | | 342/442 |
| 4,809,012 A * | 2/1989 | Tong | | 342/442 |
| 5,227,803 A * | 7/1993 | O'Connor et al. | | 342/442 |
| 5,477,230 A * | 12/1995 | Tsui | | 342/442 |
| 5,541,608 A * | 7/1996 | Murphy et al. | | 342/442 |
| 5,608,411 A * | 3/1997 | Rose | | 342/442 |
| 6,313,794 B1 * | 11/2001 | Rose | | 342/442 |
| 6,313,795 B1 * | 11/2001 | Herrmann et al. | | 342/442 |
| 6,392,598 B1 * | 5/2002 | Jones et al. | | 342/442 |
| 6,759,981 B1 * | 7/2004 | Krikorian et al. | | 342/442 |
| 2002/0011952 A1 * | 1/2002 | Pack et al. | | 342/442 |
| 2003/0197645 A1 * | 10/2003 | Ninomiya et al. | | 342/442 |
| 2009/0325598 A1 * | 12/2009 | Guigne et al. | | 455/456.1 |

FOREIGN PATENT DOCUMENTS

| | | |
|---|---|---|
| JP | 06-273504 | 9/1994 |
| JP | 2005-091365 | 4/2005 |
| JP | 2007-047047 | 2/2007 |

OTHER PUBLICATIONS

J. Noreus et al., System considerations for hardware parameters in a 60 GHz WLAN, Proc. GHz 2000 Symp., p. 267-270, 2000.*
M. Brook, "Sferics," in AccessScience, © McGraw-Hill Companies, http://www.accessscience.com, 2008.*

* cited by examiner

*Primary Examiner* — Jack W Keith
*Assistant Examiner* — Fred H Mull
(74) *Attorney, Agent, or Firm* — Robert J. Depke; Rockey, Depke & Lyons, LLC (57) ABSTRACT

Disclosed herein is a direction finding system including: a transmitter configured to generate a single carrier; a plurality of receivers, each of which has a receiving antenna; a phase comparison section configured to compare phases of signals received by the receivers to determine a phase difference between the received signals; and an information processing section configured to perform a computation process for direction finding based on the phase difference.

15 Claims, 7 Drawing Sheets

DIRECTION FINDING SYSTEM AND DIRECTION FINDING APPARATUS

CROSS REFERENCES TO RELATED APPLICATIONS

The present invention contains subject matter related to Japanese Patent Application JP 2008-004268, filed in the Japan Patent Office on Jan. 11, 2008, the entire contents of which being incorporated herein by reference.

BACKGROUND OF THE INVENTION

1. Field of the Invention

The present invention relates to a direction finding system and a direction finding apparatus for finding a direction from which a radio wave comes. In particular, the present invention relates to a direction finding system and a direction finding apparatus in which both a transmitter and a receiver are movable instead of being stationary, or in which both the transmitter and the receiver are installed on a single mobile unit.

In more detail, the present invention relates to a direction finding system and a direction finding apparatus that allow easy identification of a source of a received signal using a plurality of receiving antennas. In particular, the present invention relates to a direction finding system and a direction finding apparatus in which a plurality of reception sections are very closely spaced and which do not require a synchronization signal specially used for location search.

2. Description of the Related Art

Wireless communication technologies, such as wireless local area networks (LANs), have become widespread in recent years. For example, a wireless LAN feature has been increasingly common not only in information devices such as personal computers (PCs) but also in small and light consumer electronics (CE) devices such as digital cameras, music players, and cellular phones. In many applications of wireless communication, nondirectional antennas are used to achieve flexible connection. In contrast, portable devices having the wireless LAN feature require a small antenna, and in a typical application, two particular devices are held relatively close to each other to achieve connection therebetween using a directional antenna. Such an application requires a technique for accurately determining or estimating a direction from which a radio wave comes or a location of a source of the radio wave. It is also desirable that both a transmitter and a receiver are not stationary but movable, or that both a transmitter and a receiver are installed on a single mobile unit.

For example, a sensor system has been proposed that includes: two signal sources for generating a source signal; two antennas for transmitting the source signal to an object and receiving a reflected signal from the object, and are configured to introduce a phase shift into the source signal or the reflected signal to generate a plurality of signal patterns; and an information processing device programmed to receive the reflected signal and to determine bearing information for the object based on position and phase information in the plurality of signal patterns (see Japanese Patent Laid-open No. 2005-91365, for example). This sensor system allows an object outside a particular range to identify an object within that range, and makes it possible to determine a direction from which an object approaches an automobile.

In addition, a wireless communication system has been proposed that has a delay element for producing a delay shorter than a cycle of a clock signal to generate a delayed clock signal or a delayed response signal. In this wireless communication system, at the time of transmitting a distance-measuring signal, a clock signal and the delayed clock signal, or the clock signal and the delayed response signal, are used to start a counting operation, and based on a count value obtained by the counting operation and the response signal, or the count value and the clock signal, a difference in timing between counting of the counting operation using the clock signal and receipt of the response signal is detected, and a count value at the time of the receipt of the response signal and the detected timing difference are used to calculate a distance between wireless communication devices (see Japanese Patent Laid-open No. 2007-47047, for example).

In general, in the wireless communication, a communication signal radiates from a transmitter in all directions, and location search is accomplished by either 1) detection using signals transmitted from a plurality of transmitters at different locations or 2) detection using a plurality of receivers at different locations.

However, the location search requires a sufficient distance between the devices or use of a synchronization signal specially used for the location search. This involves an increase in cost.

Further, a direction finding apparatus has been proposed that uses a phase difference measuring instrument to measure a difference in phase between a pair of antennas, uses a time difference measuring instrument to measure a difference in time between the antennas, and uses a direction calculation device to calculate a direction in which a signal has come based on the phase difference and the time difference (see Japanese Patent Laid-open No. Hei 6-273504, hereinafter referred to as Patent Document 1, for example). This direction finding apparatus allows two-dimensional direction finding but not three-dimensional direction finding, however.

SUMMARY OF THE INVENTION

The present invention has been conceived to provide an excellent direction finding system and direction finding apparatus for suitably finding a direction from which a radio wave comes, in which both a transmitter and a receiver are movable instead of being stationary, or in which both the transmitter and the receiver are installed on a single mobile unit.

Further, the present invention has been conceived to provide an excellent direction finding system and direction finding apparatus that allow easy identification of a source of a received signal using a plurality of receiving antennas.

Still further, the present invention has been conceived to provide an excellent direction finding system and direction finding apparatus in which a plurality of reception sections are very closely spaced and which do not require a synchronization signal specially used for location search.

According to one embodiment of the present invention, there is provided a direction finding system including: a transmitter configured to generate a single carrier; a plurality of receivers, each of which has a receiving antenna; a phase comparison section configured to compare phases of signals received by the receivers to determine a phase difference between the received signals; and an information processing section configured to perform a computation process for direction finding based on the phase difference.

Note here that the term "system" as in "a direction finding system" above refers to a logical collection of a plurality of devices (or functional modules that fulfill specific functions), regardless of whether the plurality of devices or functional modules are contained in a single housing.

According to another embodiment of the present invention, there is provided a direction finding apparatus for finding a direction of a transmitter that transmits a signal, the direction finding apparatus including: a plurality of receivers, each of which has a receiving antenna; a phase comparison section configured to compare phases of signals received by the receivers to determine a phase difference between the received signals; and an information processing section configured to perform a computation process for direction finding based on the phase difference.

The present invention provides an excellent direction finding system and direction finding apparatus that are capable of easily identifying a transmitter of received signals using a plurality of receiving antennas.

Also, the present invention provides an excellent direction finding system and direction finding apparatus in which a plurality of reception sections are very closely spaced and which do not require a synchronization signal specially used for location search.

In a direction finding system according to an embodiment of the present invention, signals received by a plurality of antennas are converted into intermediate frequency signals, and a phase difference between the signals is detected to find the direction of the transmitter easily. The phase information alone is used for the direction finding, without the need to consider variations in the intensity of the signals received by the plurality of receivers.

The transmitter only needs to generate the single carrier, resulting in easy implementation. A frequency in a milli-wave zone, with a short wavelength, may be used for the single carrier. This contributes to reducing the size of the antennas, and allows the plurality of reception sections to be very closely spaced.

A mixer that can be used to down-convert the received signals may perform frequency synthesis using a frequency produced by a single oscillator. In this case, synchronization is not necessary for the oscillator at the time of receiving the signals.

In a direction finding system according to an embodiment of the present invention, synchronization is not necessary for oscillators used in the transmitter and the receivers.

These and other features and advantages of the present invention will become more apparent from the following detailed description of preferred embodiments of the present invention when taken in conjunction with the accompanying drawings.

DETAILED DESCRIPTION OF THE PREFERRED EMBODIMENTS

Hereinafter, preferred embodiments of the present invention will be described with reference to the accompanying drawings.

A direction finding system according to one embodiment of the present invention includes a transmitter that generates a single carrier, a plurality of receivers each having a receiving antenna, a phase comparison section that compares phases of signals received by the receivers to determine a phase difference between the received signals, and an information processing section that performs a computation process for direction finding based on the phase difference.

Figure 1:
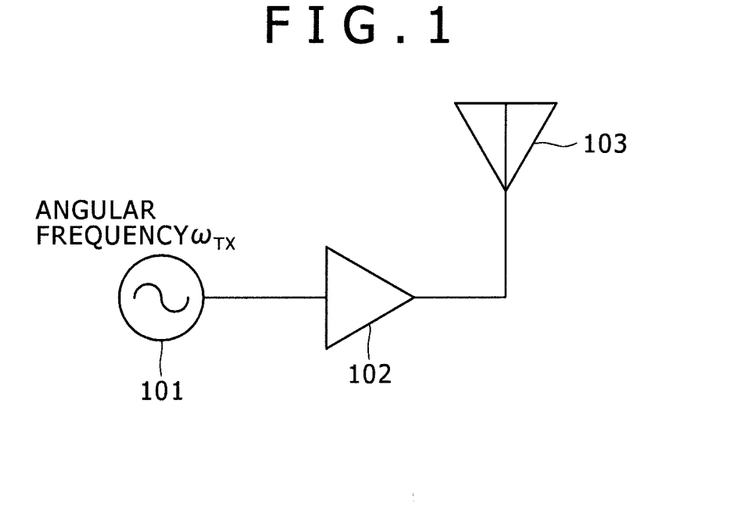
FIG. 1 illustrates the structure of a transmitter used in a direction finding system according to an embodiment of the present invention.

FIG. 1 illustrates the structure of the transmitter used in the direction finding system according to the present embodiment. In FIG. 1, the transmitter includes an oscillator 101, an amplifier 102, and a transmitting antenna 103. A carrier signal of a single frequency produced by the oscillator 101 is power-amplified by the amplifier 102 and then emitted via the transmitting antenna 103 to the outside space.

Specifically, the frequency produced by the oscillator 101 is in the milli-wave zone. Radio waves with frequencies in the milli-wave zone have wavelengths ranging from ten millimeters (30 GHz) to one millimeter (300 GHz), and have characteristics of a very short wavelength, a significant propagation loss in the air, and a great extent of straight traveling. Therefore, for use in a system that requires not a short propagation distance, antenna positioning by a user is necessary. The short wavelength allows use of small antennas, and allows a plurality of reception sections to be spaced very closely. Hereinafter, it is assumed that the wavelength of the transmitted signal is λ.

Wireless communication technologies involving use of millimeter waves have been attracting increasing attention in recent years. In particular, wireless communication technologies involving use of the 60 GHz band, which can be used without license, have been attracting increasing attention as a new communication means. Use of a bandwidth of 2.5 GHz is permitted for one transmitter, as long as a transmission output is under 10 mW. Even under this limitation, high-speed wireless communication is possible with a transmission rate of 1 Gbps or higher. This transmission rate is even higher than that of ultra-wideband (UWB), which is now being developed.

Figure 2:
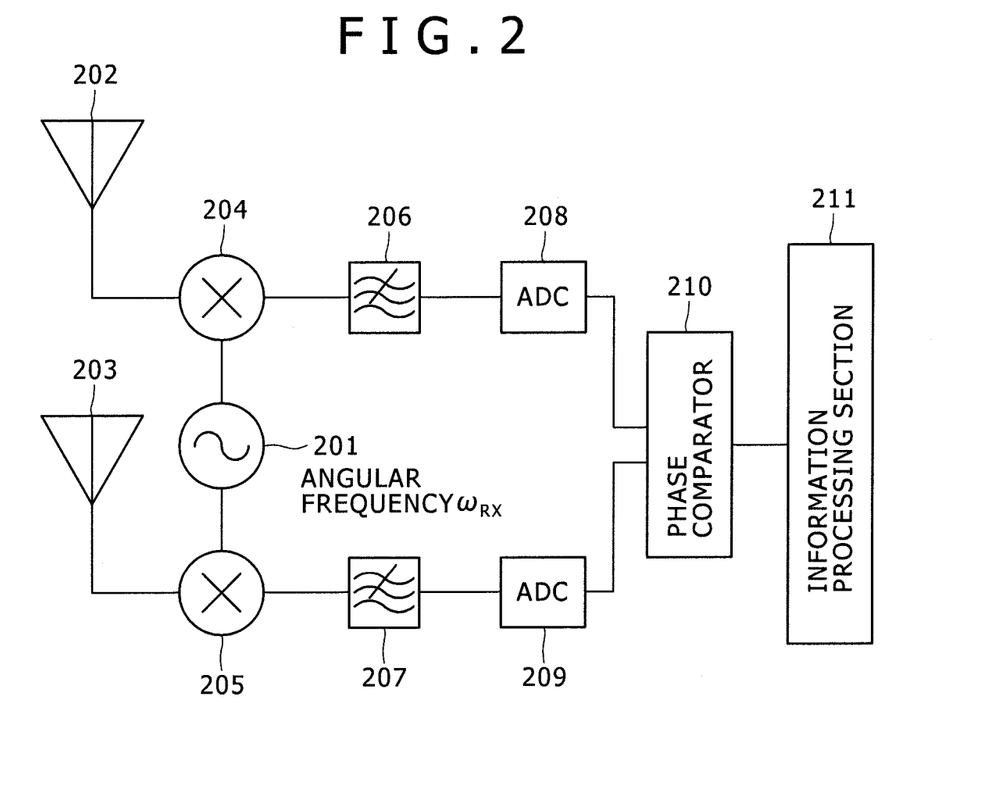
FIG. 2 illustrates the structure of a receiver used for direction finding in the direction finding system according to an embodiment of the present invention.

FIG. 2 illustrates the structure of the receiver used in the direction finding system according to the present embodiment. In FIG. 2, the receiver has two reception systems, and includes: an oscillator 201, which is shared by the two reception systems; a pair of receiving antennas 202 and 203; mixers 204 and 205, filters (LPFs (Low Pass Filters)) 206 and 207, and AD (Analog Digital) converters 208 and 209, which are provided for the receiving antennas 202 and 203, respectively; a phase comparator 210 for comparing phases of down-converted digitized received signals; and an information processing section 211 for performing a computation for direction finding based on the phase difference. A distance between the receiving antennas 202 and 203 is equal to or less than $\lambda/2$, where $\lambda$ is the wavelength of the transmitted signal.

The transmitted signal with the single frequency as emitted from the transmitter as illustrated in FIG. 1 is received by each of the receiving antennas 202 and 203 in the receiver. The mixers 204 and 205 down-convert the signals received by the receiving antennas 202 and 203, respectively, into intermediate frequency (IF) signals using the single frequency produced by the oscillator 201. The filters (LPFs) 206 and 207 remove harmonic content of the intermediate frequency signals. Then, each of the AD converters 208 and 209 converts the intermediate frequency signal into digital form. The phase comparator 210 compares the phases of the independently digitized received signals, and the information processing section 211 performs the computation using the detected phase difference to determine a direction in which the transmitter exists.

Figure 3:
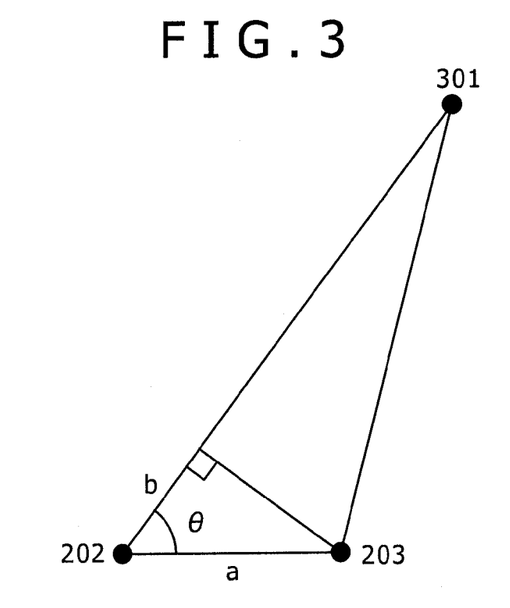
FIG. 3 illustrates an exemplary arrangement of a transmitting antenna and receiving antennas.

FIG. 3 illustrates an exemplary arrangement of the transmitting antenna 103 and the receiving antennas 202 and 203. The signal is transmitted from the transmitting antenna 103 to the receiving antennas 202 and 203, which are spaced from each other by distance a. Note that the distance a between the receiving antennas is equal to or less than $\lambda/2$. In the following descriptions, the receiving antenna that is the more distant from the transmitting antenna will be referred to as "receiving antenna A" and the receiving antenna that is the closer to the transmitting antenna will be referred to as "receiving antenna B."

Straight lines are drawn from the receiving antennas A and B to the transmitting antenna as shown in FIG. 3. An angle between the straight line joining the receiving antenna A and the transmitting antenna and a straight line joining the receiving antennas A and B is assumed to be $\theta$. Hereinafter, the angle $\theta$ will be referred to also as an "antenna angle." In addition, a distance between the receiving antenna A and the point of intersection of the straight line joining the receiving antenna A and the transmitting antenna with a perpendicular from the receiving antenna B to the straight line joining the receiving antenna A and the transmitting antenna is assumed to be b.

Because the millimeter wave emitted from the transmitter has a very short wavelengths the distance a between the receiving antennas A and B is very short as compared to the distance between the transmitting antenna and each receiving antenna. Thus, the angle $\theta$ and a phase difference $\xi$ between the signals received by the receiving antennas A and B have relationships represented by the following equations (1) and (2), where c is the speed of light and $f_{rx}$ is the frequency of the received signal.

$$\theta = \cos^{-1}(b/a) \quad (1)$$

$$b = \frac{c}{f_{rx}} \frac{\xi}{2\pi} \quad (2)$$

Figure 4:
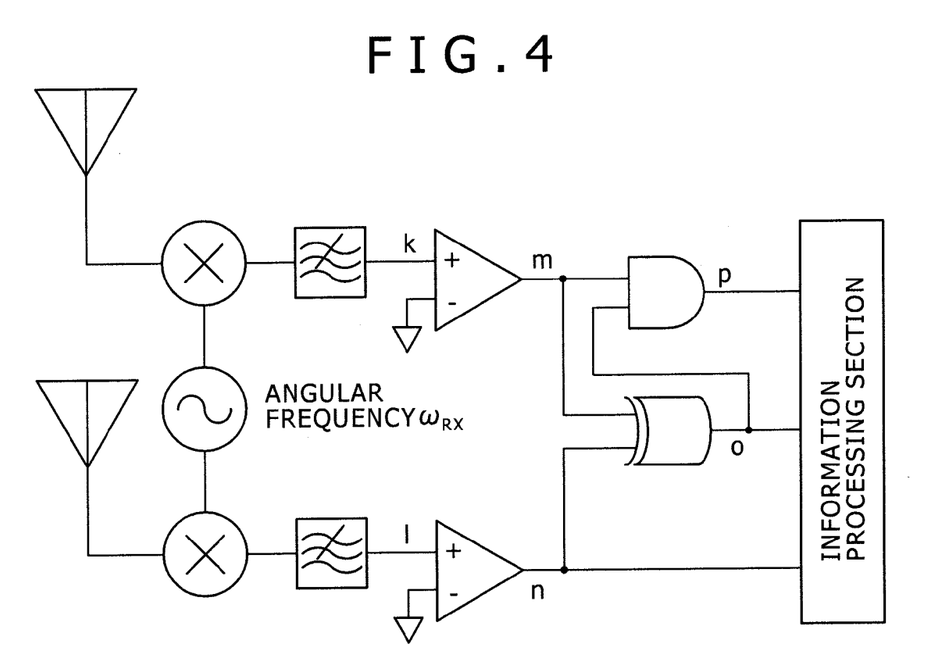
FIG. 4 illustrates details of an internal structure of a phase comparator in the receiver as illustrated in FIG. 2.

FIG. 4 illustrates details of an internal structure of the phase comparator 210 in the receiver as illustrated in FIG. 2. In FIG. 4, each of the AD converters 208 and 209 is formed by a comparator, and the phase comparator is formed by an EXOR gate. In addition, in order to measure a period of the digitized signal, an EXOR output and a comparator output are ANDed.

Accordingly, the information processing section 211 is able to calculate the aforementioned antenna angle $\theta$ based on the phase difference $\xi$ between the signals received by the receiving antennas, the phase difference $\xi$ being obtained based on a phase difference $\tau$ outputted from the EXOR gate and a period $T_{if}$ of the down-converted received signal.

Note that the information processing section 211, which performs such a computation, can be formed by a digital signal processing circuit such as a programmable IC (Integrated Circuit) (PIC), a field programmable gate array (FPGA), an application specific IC (ASIC), or the like, for example.

Figure 5:
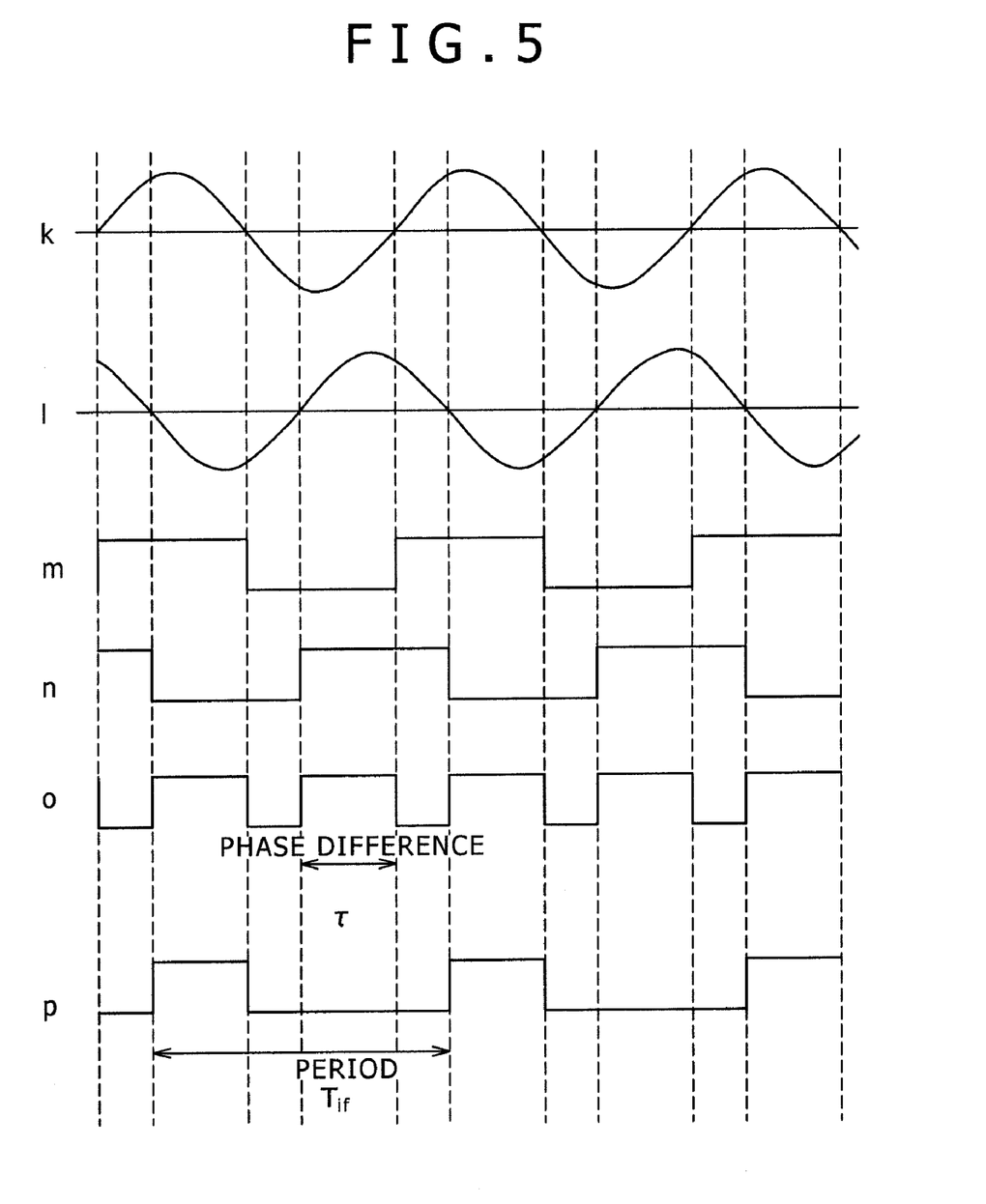
FIG. 5 shows timing diagrams k to p of signals at various stages in the receiver as illustrated in FIG. 4.

FIG. 5 shows timing diagrams k to p of the signals at various stages in the receiver as illustrated in FIG. 4. An operation of the receiver and a method for calculating the phase difference will now be described below with reference to FIG. 5.

The signals received by the receiving antennas A and B are represented by the following expressions (3) and (4), respectively, where X is the intensity of the received signal, $\psi$ is a phase difference of the oscillator in the reception section relative to the transmitted signal, and $\xi$ is the phase difference between the signals received by the receiving antennas A and B.

$$A: X\cos(\omega_{rx}t+\psi) \quad (3)$$

$$B: X\cos(\omega_{rx}t+\psi+\xi) \quad (4)$$

The signals received by the receiving antennas A and B are down-converted by the mixers into the intermediate frequency signals as represented by the following expressions (5) and (6), respectively, where Y is a signal intensity of the oscillator 201 in the receiver.

$$A: X\cos(\omega_{tx}t + \psi)Y\cos(\omega_{rx}t) = \quad (5)$$
$$\frac{XY}{2}[\{\cos(\omega_{tx} + \omega_{rx})t + \psi\} + \{\cos(\omega_{tx} - \omega_{rx})t + \psi\}]$$

$$B: X\cos(\omega_{tx}t + \psi + \xi)Y\cos(\omega_{rx}t) = \quad (6)$$
$$\frac{XY}{2}[\{\cos(\omega_{tx} + \omega_{rx})t + \psi + \xi\} + \{\cos(\omega_{tx} - \omega_{rx})t + \psi + \xi\}]$$

Then, the intermediate frequency signals are passed through the low-pass filters 206 and 207, respectively, to remove the harmonic content therefrom, resulting in the received signals represented by the following expressions (7) and (8), respectively, and the waveforms thereof are represented by the k and l portions of FIG. 5, respectively.

$$A: X\cos(\omega_{tx}t + \psi)Y\cos(\omega_{rx}t) = \frac{XY}{2}\{\cos(\omega_{tx} - \omega_{rx})t + \psi\} \quad (7)$$

$$B: X\cos(\omega_{tx}t + \psi + \xi)Y\cos(\omega_{rx}t) = \frac{XY}{2}\{\cos(\omega_{tx} - \omega_{rx})t + \psi + \xi\} \quad (8)$$

The outputs from the low-pass filters 206 and 207 are converted by the AD converters 208 and 209, respectively, each formed by the comparator, into digital form. In the example as illustrated in FIG. 5, the comparator converts all analog values above 0 into a digital value "1" and all analog values below 0 into a digital value "0." Waveforms presented at the m and n portions of FIG. 5 correspond to outputs from the AD conversion of the aforementioned analog waveforms k and l, respectively.

The o portion of FIG. 5 represents an output signal obtained by performing the EXOR operation on the digitized received signals m and n. It is possible to extract the phase difference $\tau$ between the two received signals m and n by performing the EXOR operation on the two received signals m and n.

The p portion of FIG. 5 represents a signal waveform obtained by performing the AND operation on the output o from the EXOR gate and one of the digitized received signals. With this signal waveform p, it is possible to extract a waveform of the signal outputted from the mixer, i.e., the period $T_{if}$.

As a result, the phase difference ξ between the signals received by the receiving antennas A and B can be obtained using the following equation (9).

$$\xi = \frac{2\pi\tau}{T_{if}} \quad (9)$$

The above equation (9) is substituted into the aforementioned equation (2), and its result is substituted into the equation (1), so that the desired antenna angle θ can be obtained using equation (10) below.

$$\theta = \cos^{-1}\left(\frac{c}{af_{rx}} \times \frac{\tau}{T_{if}}\right) \quad (10)$$

Next, a method for detecting the antenna angle accurately will now be described below.

Figure 6A:
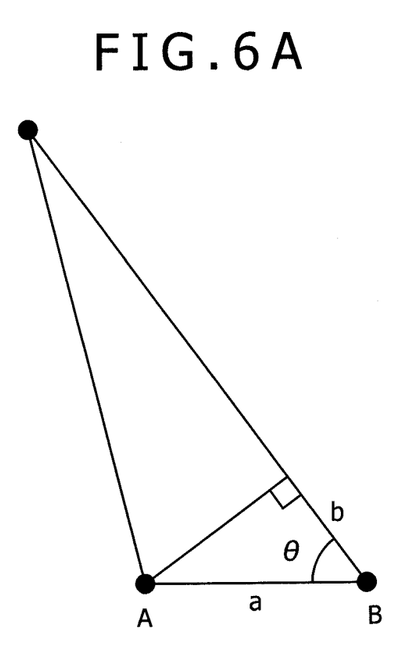
FIGS. 6A and 6B show two possible relative positions of the transmitting and receiving antennas, with the same antenna angle θ.
Figure 6B:
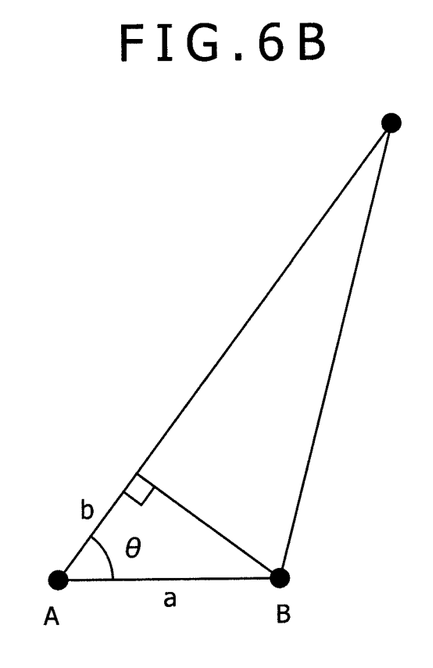

According to the above-described method of calculating the antenna angle θ, it is possible to determine the antenna angle θ in relation to the transmitter. However, there are two possible directions of the transmitter as illustrated in FIGS. 6A and 6B, depending on the relative positions of the receiving antennas. Thus, a need still remains to derive the accurate direction of the transmitter.

On the assumption that the wavelength of the transmitted signal is λ, the distance between the receiving antennas A and B is shorter than λ/2. Therefore, the maximum phase difference between the signals received by the antennas A and B is 180 degrees. In other words, the difference in phase of the signal received by the receiving antenna A from the signal received by the receiving antenna B is a maximum of 180 degrees, forward or backward.

A consideration of relationships between the relative positions of the transmitting and receiving antennas as illustrated in FIGS. 6A and 6B and the phase difference between the signals received by the receiving antennas A and B will make it clear that the phase of the signal received by the receiving antenna A will be 0 to 180 degrees forward relative to the phase of the signal received by the receiving antenna B, when the relative positions of the transmitting and receiving antennas are such as illustrated in FIG. 6A, and that the phase of the signal received by the receiving antenna A will be 0 to 180 degrees backward relative to the phase of the signal received by the receiving antenna B, when the relative positions of the transmitting and receiving antennas are such as illustrated in FIG. 6B. Therefore, the determination of the phase difference between the signals received by the receiving antennas A and B will determine whether the relative positions of the transmitting and receiving antennas are such as illustrated in FIG. 6A or FIG. 6B.

Moreover, the rising or falling timing coincides between the signal o outputted from the EXOR gate as the phase comparator 210 and the logical product p of the output from the EXOR gate and one of the two digitized received signals, i.e., the digitized received signal m, depending on the phase difference between the received signals (in other words, the relative positions of the transmitting and receiving antennas).

Accordingly, the information processing section 211 is able to determine the direction of the transmitting antenna by determining which of the two digitized received signals being compared is behind the other in terms of phase, based on how the rising and falling of the logical product p of the output from the EXOR gate and one of the digitized received signals, i.e., the digitized received signal m, and the other of the digitized received signals, i.e., the digitized received signal n, occur when these two signals change in value at the same time.

Figure 7A:
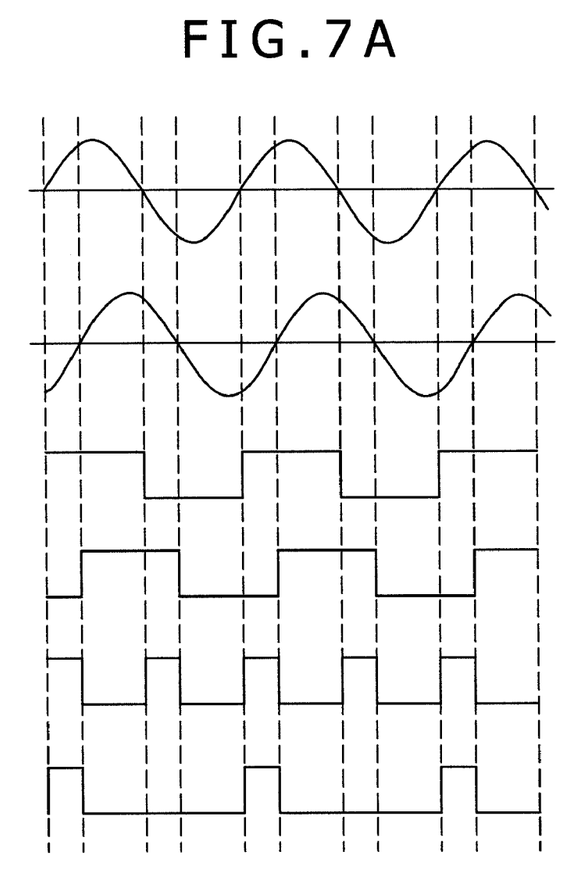
FIGS. 7A and 7B show timing diagrams k to p of signals at various stages in the receiver, corresponding to the relative positions of the transmitting and receiving antennas as illustrated in FIGS. 6A and 6B, respectively.
Figure 7B:
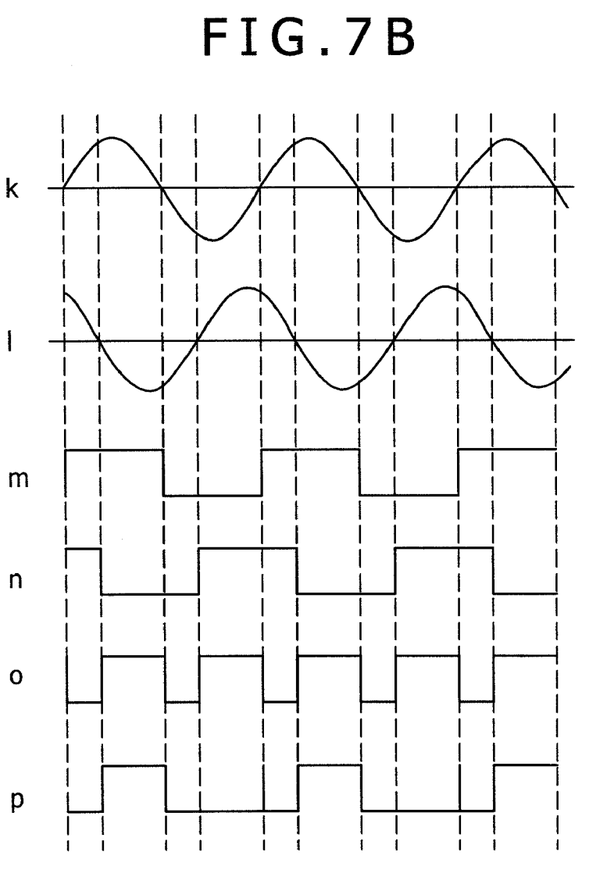

FIGS. 7A and 7B show timing diagrams k to p of signals at various stages in the receiver, corresponding to the relative positions of the transmitting and receiving antennas as illustrated in FIGS. 6A and 6B, respectively. Here, the k and l portions correspond to the receiving antennas A and B, respectively. Focusing on the logical product p of the signal o, representing the phase difference between the two digitized received signals m and n, obtained by the EXOR operation and one of the two digitized received signals, i.e., the received signal m, and the other of the digitized received signals, i.e., the received signal n, will clarify the following two points.

(1) When the transmitting and receiving antennas have the relative positions as illustrated in FIG. 6A, the rising of the digitized received signal n coincides with the falling of the logical product signal p.

(2) When the transmitting and receiving antennas have the relative positions as illustrated in FIG. 6B, the falling of the digitized received signal n coincides with the rising of the logical product signal p.

In addition, focusing on the timing diagrams of the digitized signal m and the logical product signal p in FIGS. 7A and 7B will clarify similar regularity, which can be a basis for determining the relative positions of the transmitting and receiving antennas. The regularity in this case is as follows.

(1) When the transmitting and receiving antennas have the relative positions as illustrated in FIG. 6A, the rising of the digitized received signal m coincides with the rising of the logical product signal p.

(2) When the transmitting and receiving antennas have the relative positions as illustrated in FIG. 6B, the falling of the digitized received signal m coincides with the falling of the logical product signal p.

Accordingly, with the structure of the receiver as illustrated in FIG. 4, the information processing section 211 is able to determine the direction of the transmitting antenna by checking the timing of the rising and falling of the signals n and p (or the signals m and p).

A table below shows a summary of the relationships between the phase difference between the signals received by the receiving antennas A and B and the timing of the simultaneous change in value of the signals n and p as shown in FIGS. 7A and 7B.

TABLE 1

| | Phase Difference between Receiving antennas A and B (A as Reference) | |
| --- | --- | --- |
| | 0 to 180° Forward | 0 to 180° Backward |
| n | Falling | Rising |
| p | Rising | Falling |

As described above, it is possible to determine the accurate direction of the antenna, whichever direction the radio wave received has come from. Moreover, the determination of the relative positions of the transmitting and receiving antennas does not require transmission from the transmitter of a pulse-modulated RF (radio frequency) signal specially used for the direction finding (see Patent Document 1), and mere emission of a carrier frequency signal (in the milli-wave zone) suffices. Further, the receiver does not need to be equipped with a time difference measuring instrument for directly measuring a time difference between receipt of the RF signal by the different receiving antennas (see Patent Document 1).

The receiver as illustrated in FIGS. 2 and 4 uses two receiving antennas, and is capable of two-dimensional direction finding. Three-dimensional direction finding requires three or more receiving antennas.

Figure 8:
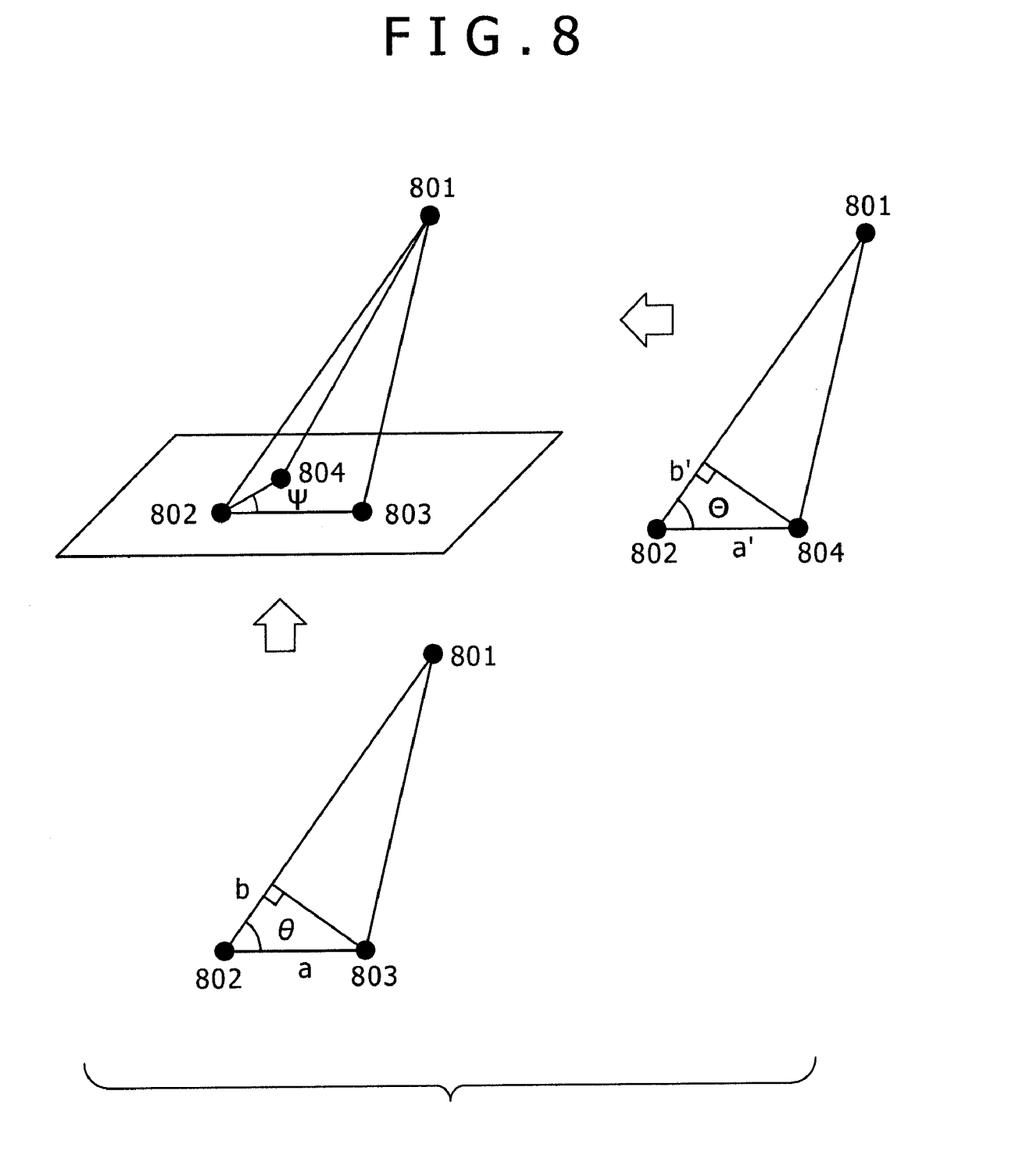
FIG. 8 illustrates an exemplary arrangement of a transmitting antenna and three receiving antennas, in the case where three-dimensional direction finding is performed.
Figure 9:
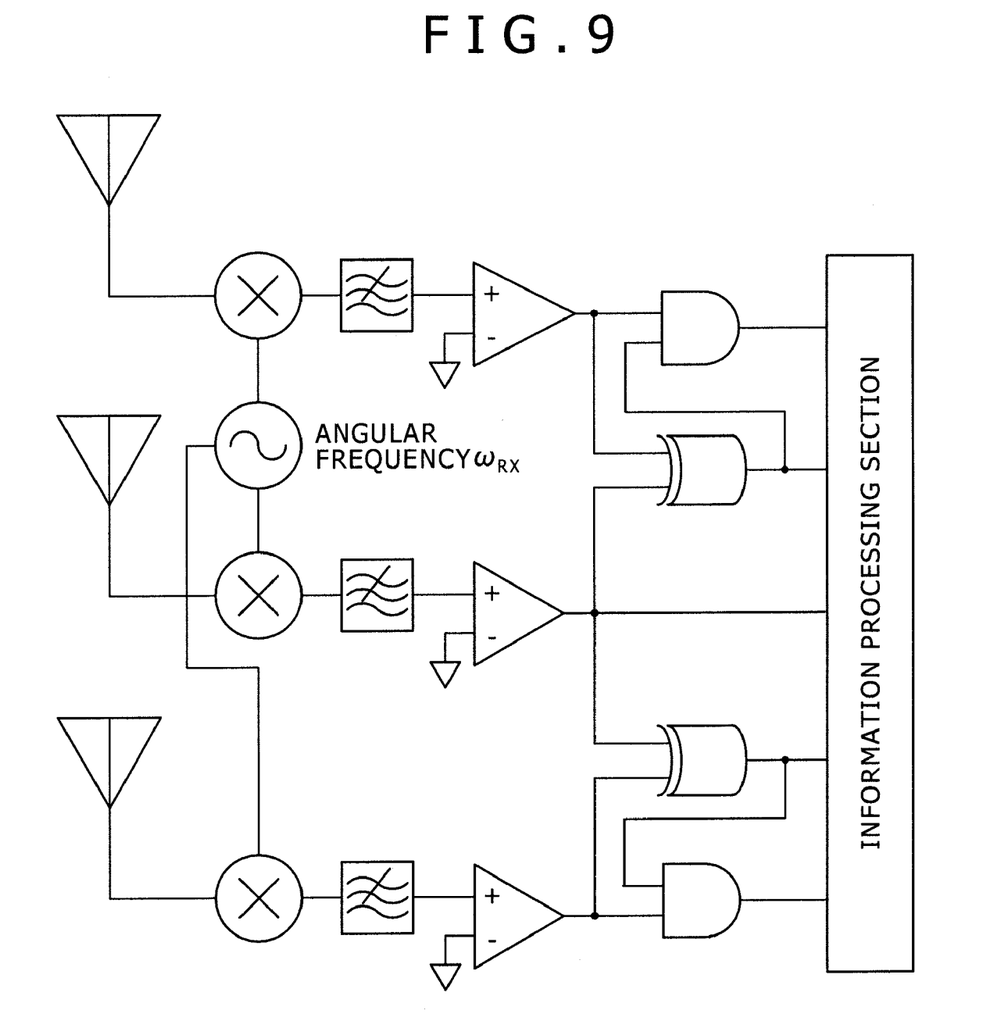
FIG. 9 illustrates the structure of a receiver used for the direction finding in a direction finding system with the arrangement of the transmitting and receiving antennas as illustrated in FIG. 8

FIG. 8 illustrates an exemplary arrangement of a transmitting antenna 801 and three receiving antennas 802, 803, and 804, in the case where the three-dimensional direction finding is performed. FIG. 9 illustrates the structure of a receiver used for the direction finding in a direction finding system with the arrangement of the transmitting and receiving antennas as illustrated in FIG. 8. It is assumed here that, as in the above-described system, the carrier signal of the single frequency in the milli-wave zone is transmitted from the transmitter to the receiving antennas.

In FIG. 9, the receiver has three reception systems, each of which has a receiving antenna, a mixer, a filter (LPF), and an AD converter. Phase comparators in a subsequent stage compare phases of down-converted digitized received signals, and an information processing section performs a computation based on the phase differences to determine the three-dimensional direction of the transmitter. Note that, as with the structure as illustrated in FIG. 4, each AD converter is formed by a comparator, and each phase comparator is formed by an EXOR gate. A distance between each pair of receiving antennas is equal to or less than $\lambda/2$, where $\lambda$ is the wavelength of the transmitted signal.

The transmitted signal with the single frequency as emitted from the transmitter as illustrated in FIG. 1 is received by each of the receiving antennas A to C (802 to 804) in the receiver. Each mixer down-converts the received signal into the intermediate frequency (IF) signal using the single frequency produced by the oscillator 201. Each filter (LPF) removes the harmonic content of the intermediate frequency signal, and each comparator converts the intermediate frequency signal into digital form. The two phase comparators compare the phases of the digitized received signals received by the receiving antennas A and B and the receiving antennas A and C, respectively, and the information processing section 211 performs a computation using the detected phase differences to determine the direction in which the transmitter exists.

The exemplary arrangement of the transmitting and receiving antennas as illustrated in FIG. 8 corresponds to a combination of two sets of the transmitting and receiving antennas as illustrated in FIG. 3. While the arrangement of the transmitting and receiving antennas as illustrated in FIG. 3 accomplishes only the two-dimensional direction finding, the combination of the two sets, each of which accomplishes the two-dimensional direction finding independently, accomplishes the three-dimensional direction finding by combining the results obtained by the two sets.

In the exemplary arrangement as illustrated in FIG. 8, the receiving antennas 802 and 803 are spaced by distance a, and the receiving antennas 802 and 804 are spaced by distance a'. An angle between a straight line joining the receiving antennas 802 and 803 and a straight line joining the receiving antennas 802 and 804 is $\Psi$.

A straight line is drawn from each of the receiving antennas 802 and 803 to the transmitting antenna 801. An antenna angle between the straight line joining the receiving antenna 802 and the transmitting antenna 801 and the straight line joining the receiving antennas 802 and 803 is assumed to be $\theta$. In addition, a distance between the receiving antenna A and the point of intersection of the straight line joining the receiving antenna 802 and the transmitting antenna 801 with a perpendicular from the receiving antenna 803 to the straight line joining the receiving antenna 802 and the transmitting antenna 801 is assumed to be b. Then, the angle $\theta$ and the phase difference $\xi$ between the signals received by the receiving antennas 802 and 803 have the relationships represented by the aforementioned equations (1) and (2).

Also, a straight line is drawn from each of the receiving antennas 802 and 804 to the transmitting antenna 801. An antenna angle between the straight line joining the receiving antenna 802 and the transmitting antenna 801 and the straight line joining the receiving antennas 802 and 804 is assumed to be $\Theta$. In addition, a distance between the receiving antenna A and the point of intersection of the straight line joining the receiving antenna 802 and the transmitting antenna 801 with a perpendicular from the receiving antenna 804 to the straight line joining the receiving antenna 802 and the transmitting antenna 801 is assumed to be b'. Then, the angle $\Theta$ and a phase difference $\Xi$ between the signals received by the receiving antennas 802 and 804 have relationships as represented by the aforementioned equations (1) and (2).

The information processing section calculates the aforementioned antenna angle $\theta$ based on the phase difference $\xi$ between the signals received by the receiving antennas 802 and 803, the phase difference $\xi$ being obtained based on the phase difference $\tau$, outputted from one of the two EXOR gates, between the down-converted received signals received by the receiving antennas 802 and 803 and the period $T_{if}$ of the down-converted received signal. In addition, the information processing section calculates the aforementioned antenna angle $\Theta$ based on a phase difference $\Xi$ between the signals received by the receiving antennas 802 and 804, the phase difference $\Xi$ being obtained based on a phase difference T, outputted from the other of the two EXOR gates, between the down-converted received signals received by the receiving antennas 802 and 804 and a period $T_{if}'$ of the down-converted received signal.

Further, the information processing section derives an accurate direction of the transmitting antenna 801 in relation to the receiving antennas 802 (A) and 803 (B), depending on how the rising or falling timing coincides between the logical product of the output from the one of the EXOR gates and one of the two digitized received signals inputted to this EXOR gate, i.e., the digitized received signal 803 (B), and the other of the two digitized received signals inputted to this EXOR gate, i.e., the digitized received signal 802 (A). Similarly, the information processing section derives an accurate direction of the transmitting antenna 801 in relation to the receiving antennas 802 (A) and 804 (C), depending on how the rising or falling timing coincides between the logical product of the output from the other of the EXOR gates and one of the two digitized received signals inputted to this EXOR gate, i.e., the digitized received signal 804 (C), and the other of the two digitized received signals inputted to this EXOR gate, i.e., the digitized received signal 802 (A).

In the above-described manner, the two-dimensional direction of the transmitting antenna 801 in relation to the receiving antennas 802 (A) and 803 (B) and the two-dimensional direction of the transmitting antenna 801 in relation to the receiving antennas 802 (A) and 804 (C) are found. Then, the three-dimensional direction of the transmitting antenna 801 can be found by processing the above two pieces of information about the two-dimensional directions and the angle $\Psi$ between the straight line joining the receiving antennas 802 and 803 and the straight line joining the receiving antennas 802 and 804 as illustrated in FIG. 8.

The present invention has been described in detail above, with reference to specific embodiments. However, it should be understood by those skilled in the art that various modifications, combinations, sub-combinations and alterations may occur depending on design requirements and other factors insofar as they are within the scope of the appended claims or the equivalents thereof.

In the present specification, the direction finding system having the receiver using two receiving antennas has been described by way of illustration. Note, however, that the present invention is not limited to any specific number of receiving antennas. The receiver may have three or more receiving antennas in other embodiments of the present invention.

What is claimed is:

1. A direction finding system, comprising:
    a transmitter configured to generate a single carrier;
    a plurality of receivers, each of which has a receiving antenna;
    a phase comparison section configured to generate relative phase information for signals that are received at each of the plurality of receivers in order to determine a phase difference between signals received at the receivers; and
    an information processing section configured to perform a computation process for direction finding based on the phase difference, and wherein the phase difference information is determined based on analysis of a digitally converted version of the received signals, and further wherein the respective outputs from each of the receivers feed into separate mixers and the outputs from the mixers are filtered and transferred to respective converting circuits that respectively provide digital outputs that feed into a common phase comparator, and an information processing section resolves direction ambiguity based on determination of whether a rising/falling signal condition or falling/rising signal condition exists for a digitized received signal and a logical product signal.

2. The direction finding system according to claim 1, wherein said transmitter generates a frequency in a milli-wave zone.

3. The direction finding system according to claim 1, wherein the receiving antenna of each of said receivers is nondirectional or has the same directivity.

4. The direction finding system according to claim 1, wherein each receiving antenna is spaced from the other by a distance of equal to or less than $\lambda/2$, where $\lambda$ is a wavelength of a transmitted signal.

5. The direction finding system according to claim 1, wherein,
    each of said receivers once down-converts each received signal into an intermediate frequency signal using a mixer, and then converts the resulting intermediate frequency signal into digital form, and
    said phase comparison section determines the phase difference using the digitized signals.

6. The direction finding system according to claim 5, wherein the mixer in each of said receivers performs frequency synthesis using a frequency produced by a single oscillator.

7. The direction finding system according to claim 5, wherein,
    said phase comparison section is formed by an EXOR gate that takes an exclusive OR of two digitized received signals being compared,
    said phase comparison section calculates a logical product of an output from the EXOR gate and one of the two digitized received signals being compared, to determine a period $T_{if}$ of the down-converted received signal, and
    said information processing section calculates an antenna angle $\theta$ between a straight line joining the receiving antennas and a straight line joining a transmitting antenna and one of the receiving antennas, based on a phase difference $\xi$ between the signals received by the receiving antennas, the phase difference $\xi$ being obtained based on a phase difference $\tau$ outputted from the EXOR gate and the period $T_{if}$ of the down-converted received signal.

8. The direction finding system according to claim 7, wherein,
    said information processing section determines a direction of the transmitting antenna by determining which of the two digitized received signals being compared is behind the other in terms of phase, based on how rising and falling of the logical product of the output from the EXOR gate and the one of the two digitized received signals being compared and the other of the two digitized received signals being compared occur when these two signals change in value at the same time.

9. A direction finding apparatus for finding a direction of a transmitter that transmits a signal, the direction finding apparatus comprising:
    a plurality of receivers, each of which has a receiving antenna;
    a phase comparison section configured to compare phases of signals received by said receivers to determine a phase difference between the received signals; and
    an information processing section configured to perform a computation process for direction finding based on the phase difference, and wherein the phase difference information is determined based on analysis of a digitally converted version of the received signals, and further wherein the respective outputs from each of the receivers feed into separate mixers and the outputs from the mixers are filtered and transferred to respective converting circuits that respectively provide digital outputs that feed into a common phase comparator, and an information processing section resolves direction ambiguity based on determination of whether a rising/falling signal condition or falling/rising signal condition exists for a digitized received signal and a logical product signal.

10. The direction finding apparatus according to claim 9, wherein,
    the transmitter transmits a frequency in a milli-wave zone to each of the receiving antennas, and
    each receiving antenna is spaced from the other by a distance of equal to or less than $\lambda/2$, where $\lambda$ is a wavelength of the transmitted signal.

11. The direction finding apparatus according to claim 9, wherein the receiving antenna of each of said receivers is nondirectional or has the same directivity.

12. The direction finding apparatus according to claim 9, wherein,
    each of said receivers once down-converts each received signal into an intermediate frequency signal using a mixer, and then converts the resulting intermediate frequency signal into digital form, and
    said phase comparison section determines the phase difference using the digitized signals.

13. The direction finding apparatus according to claim 12, wherein the mixer in each of said receivers performs frequency synthesis using a frequency produced by a single oscillator.

14. The direction finding apparatus according to claim 12, wherein,
   said phase comparison section is formed by an EXOR gate that takes an exclusive OR of two digitized received signals being compared,
   said phase comparison section calculates a logical product of an output from the EXOR gate and one of the two digitized received signals being compared, to determine a period $T_{if}$ of the down-converted received signal, and
   said information processing section calculates an antenna angle $\theta$ between a straight line joining the receiving antennas and a straight line joining a transmitting antenna and one of the receiving antennas, based on a phase difference $\xi$ between the signals received by the receiving antennas, the phase difference $\xi$ being obtained based on a phase difference $\tau$ outputted from the EXOR gate and the period $T_{if}$ of the down-converted received signal.

15. The direction finding apparatus according to claim 14, wherein,
   said information processing section determines a direction of the transmitting antenna by determining which of the two digitized received signals being compared is behind the other in terms of phase, based on how rising and falling of the logical product of the output from the EXOR gate and the one of the two digitized received signals being compared and the other of the two digitized received signals being compared occur when these two signals change in value at the same time.

* * * * *